United States Patent [19]

Leis

[11] Patent Number: 5,166,663
[45] Date of Patent: Nov. 24, 1992

[54] SELF CONTAINED AIR OPERATED PIVOTING SIGN DEVICE FOR VEHICLE

[76] Inventor: Kenneth Leis, 1121 Brynllawn Rd., Villanova, Pa. 19085

[21] Appl. No.: 657,810

[22] Filed: Feb. 20, 1991

[51] Int. Cl.⁵ ............................................. B60Q 1/26
[52] U.S. Cl. .................................. 340/433; 340/487; 116/39; 180/281
[58] Field of Search ............... 340/433, 487, 468, 488, 340/489; 180/281; 116/39, 28 R; 40/477, 479

[56] References Cited

U.S. PATENT DOCUMENTS

| | | | |
|---|---|---|---|
| 1,291,553 | 1/1919 | Kodama | 116/39 |
| 1,296,065 | 3/1919 | Forbes | 116/39 |
| 1,331,158 | 2/1920 | Kunisin | 116/39 |
| 2,006,654 | 7/1935 | Roan | 116/39 |
| 2,252,529 | 8/1941 | Simpkins et al. | 116/39 |
| 4,138,668 | 2/1979 | Latta, Jr. et al. | 340/433 |
| 4,339,744 | 7/1982 | Latta, Jr. | 340/433 |
| 4,559,518 | 12/1985 | Latta, Jr. | 340/433 |
| 4,766,413 | 8/1988 | Reavell | 340/433 |
| 4,816,804 | 3/1989 | Reavell | 340/433 |
| 4,916,372 | 4/1990 | Reavell et al. | 340/433 |
| 4,956,630 | 9/1990 | Wicker | 340/433 |

Primary Examiner—Jin F. Ng
Assistant Examiner—Christine K. Oda
Attorney, Agent, or Firm—Panitch Schwarze Jacobs & Nadel

[57] ABSTRACT

An electrically operated, air-driven pivotal sign device includes a housing and a sign assembly pivotally mounted to the housing. Within the housing, an electrically driven air compressor is pneumatically coupled through tubing and a three-way, electrically controlled valve, to a spring return type air cylinder coupled with a shaft from the pivotable sign assembly. Current supplied through a single wire to the device activates the compressor and closes the valve to atmosphere permitting pressurization of the air cylinder. The compressor is shut off automatically when the sign assembly is deployed. The sign assembly remains deployed until current is cut off to the valve, which causes the valve to vent the pneumatic coupling to atmosphere. The single wire also supplies current to a flasher device within the housing which flashes lights provided on the sign assembly simultaneously with the pivotal deployment of the sign assembly.

7 Claims, 2 Drawing Sheets

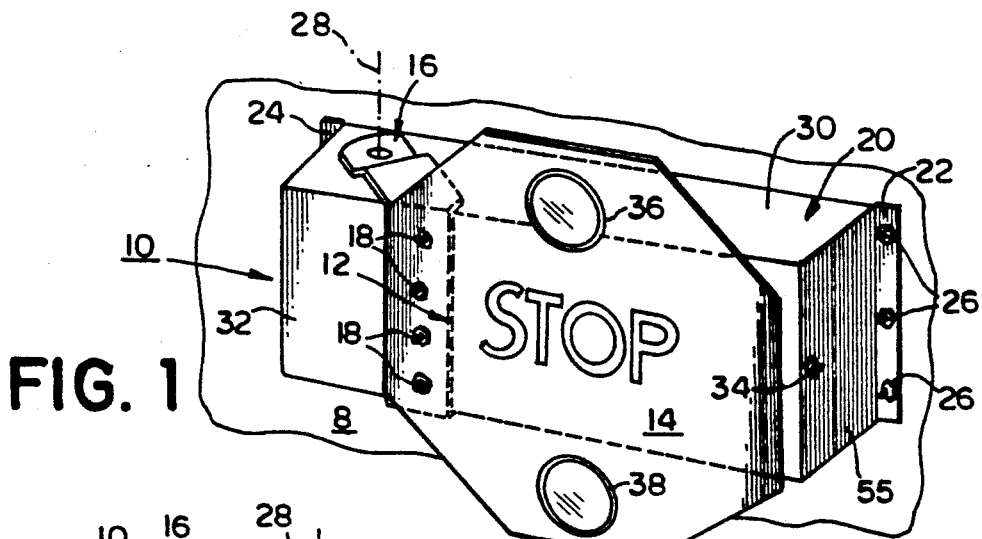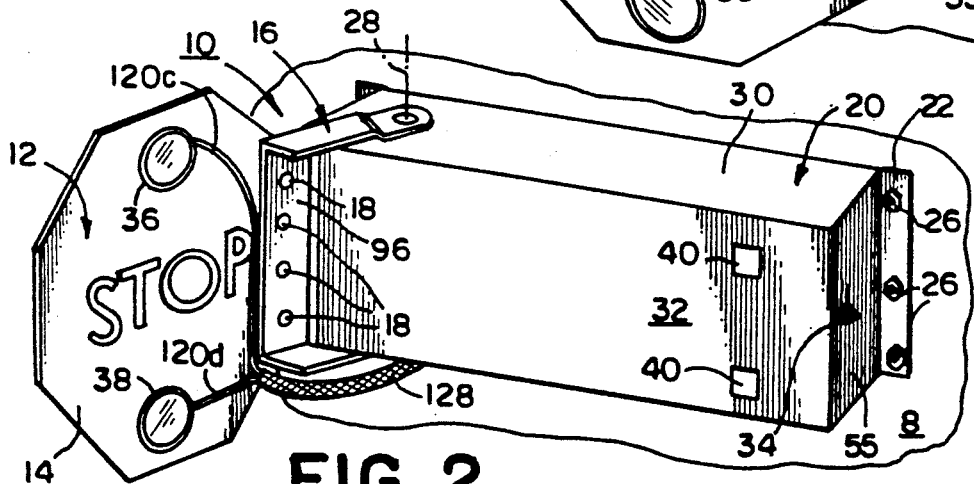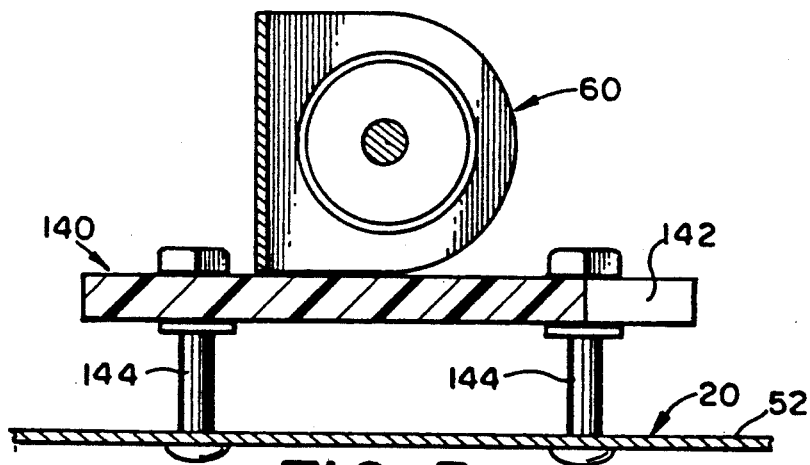

SELF CONTAINED AIR OPERATED PIVOTING SIGN DEVICE FOR VEHICLE

BACKGROUND OF THE INVENTION

This invention is directed to a driven, pivoting sign device for use on a vehicle such as a school bus, which can be provided as a self-contained unit for mounting to the vehicle as a piece of original equipment or as an aftermarket accessory.

FIELD OF THE INVENTION

Driven stop signs for school buses and the like have been known for many years. U.S. Pat. No. 2,252,529 describes a vacuum actuated sign mechanism in use since the 1930's. The sign is normally held against the side of the bus by a spring retainer. When a control valve is opened, vacuum provided by the vehicle pulls in a diaphragm which overrides a spring retainer and causes the sign to swing out about a vertical axis. Appropriate circuitry connected to a vacuum valve plunger activates blinking lights on the sign and on the front and back of the bus. However, the sign itself is deployed solely by the vacuum system. Closing of the valve causes the diaphragm to return to its normal position and the sign to return to the side of the bus. This system requires a larger vacuum source tank on the vehicle and a network of tubing from the engine intake manifold, supplying the vacuum to the tank, and from the tank to the mechanism on the side of the bus. Such tubing is typically made of metal for longevity and is expensive to purchase and install. A rupture anywhere along the tube or at any of the seals or joints renders the system inoperative. The neoprene diaphragm itself can develop air leaks as a result of aging and apparently requires a significant amount of time for removal and replacement when it fails.

In more recent years, electric motor-driven stop sign devices have supplanted vacuum-operated devices for most school buses and the like. Electric motor-driven devices of this type are disclosed, for example, in U.S. Pat. Nos. 4,138,688, 4,766,413 and 4,956,630. The devices disclosed in each of these patents is provided with a generally rectangular housing which may be bolted or otherwise secured to the outer side of a bus or like vehicle. A stop sign is pivotally mounted by means of a bracket pivotably coupled with the housing. One or more electric lights may be provided on the side to work in conjunction with the extension of the sign. Both unidirectional and reversible electric motors have been disclosed. Generally speaking, the unidirectional electric motors are cheaper to purchase and easier to regulate, but require more complicated mechanical linkages to provide reciprocating action to the sign. This is disclosed, for example, in U.S. Pat. No. 4,138,668. Reversible electric motors are more expensive and usually require more complicated controls to provide separate or reverse currents. However, they permit the direct coupling or nearly direct coupling of the motor directly to the pivotable bracket supporting the sign. This is shown, for example, in U.S. Pat. No. 4,956,630.

In addition to the foregoing, some driven pivoting sign devices are reported to employ compressed-air systems for use on buses and other vehicles having an air compressor, which is typically provided for air brakes. It is believed existing compressed air operated devices suffer from the same infirmities suffered by conventional, vacuum-operated systems.

It would be desirable to combine simplicity of an air-operated pivoting sign device, which require little control, with the simplicity of a single electrical wire connection enjoyed by the unidirectional motor-driven devices for simple control, mounting and operation.

It would further be desirable to provide an electrically powered pivoting sign device for mounting on a vehicle in which the electric drive is used for only a portion of the sign deployment and retraction cycle.

It would also be desirable to provide an electrically driven pivoting sign device which cycles more quickly than a sign mechanically linked to a geared-down electric motor.

It would also be desirable to provide a fluid-operated actuator in a pivoting sign device for mounting on a vehicle having improved service life over diaphragms previously employed.

SUMMARY OF THE INVENTION

In one aspect, the invention is a pivoting sign device for mounting on a motor vehicle comprising: a housing adapted for mounting on a motor vehicle; sign means pivotally mounted to the housing for rotating about an axis; actuator means at least partially located within the housing, the actuator means including a movable member coupled to the sign means for rotating the sign means about the pivot axis, the member being movable in response to an air pressure varied from atmospheric air pressure; and air pressure adjustment means coupling the actuator means directly to atmosphere, the adjustment means being electrically operated for altering air pressure within the actuator means from an atmospheric level to move the movable member and rotate the sign means.

In another aspect, the invention is a pivoting sign device for mounting on a motor vehicle comprising: a housing adapted for mounting on a motor vehicle; sign means pivotally mounted to the housing for rotating about an axis; a fluid cylinder within the housing, the fluid cylinder including a generally tubular, closed housing, a piston mounted for reciprocation through the tubular housing, an arm coupled with the piston for reciprocation with the piston, an end of the arm extending through an end of the tubular housing, a fluid coupling into the tubular housing on one side of the piston for moving the piston in a first direction relative to an initial position within the tubular housing and biasing means effectively coupled with the tubular housing and at least one of the piston and the arm for returning the piston to an initial position after movement in the first direction; and means coupling the end of the arm with the sign means for pivoting the sign means about the axis with the fluid cylinder.

BRIEF DESCRIPTION OF THE DRAWINGS

The foregoing summary and objects, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 1 is an isometric view of a preferred embodiment electrically operated, air-driven pivotal sign device according to the present invention with the pivotable sign portion of the device in a retracted position;

FIG. 2 is an isometric view of the device of FIG. 1 showing the sign portion in an extended position;

FIG. 5 is a view taken along the lines 5—5 of FIG. 3.

DESCRIPTION OF PREFERRED EMBODIMENTS

Figures 3, 4:
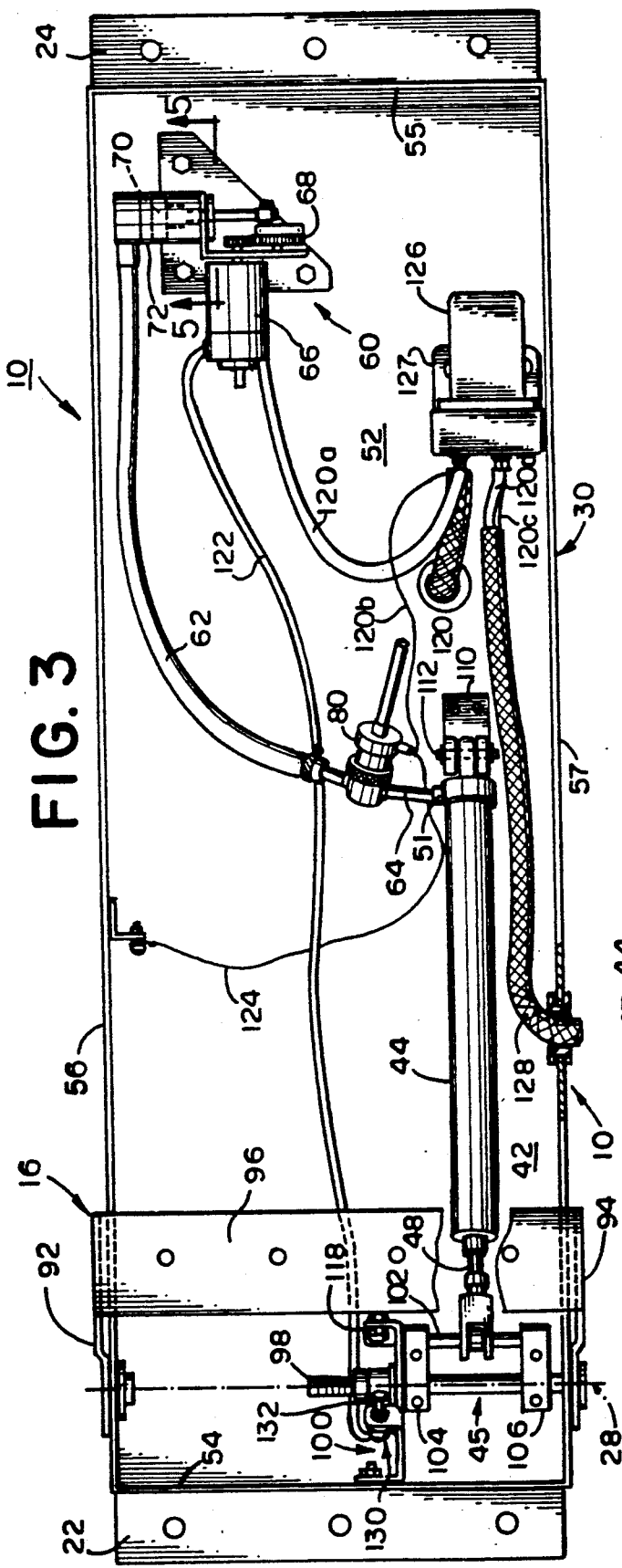
FIG. 3 is an elevation of the device of FIGS. 1 and 2 with the cover removed to reveal the internal components.
FIG. 4 is a sectional view, partially broken, of the air cylinder of FIGS. 3.

In the drawings, like numerals are employed to indicate the same elements throughout. There is shown in all the figures a presently preferred embodiment of an electrically powered, air driven pivoting sign device which is indicated generally at 10. The device 10 is typically mounted on an outer surface of a motor vehicle such as an outer side wall of a school bus, indicated generally at 8 in FIGS. 1 and 2. The major externally visible components of the device 10 include a pivoting sign means or structure, indicated generally at 12, and, preferably, a generally boxlike housing, indicated generally at 20, having a flat side hidden in FIGS. 1 and 2 which permits mounting of the housing 20 to the planar side wall 8 of the motor vehicle.

The sign structure 12 is pivotally mounted to the housing 20 to rotate about an axis 28 preferably extending vertically through the housing 20. Sign structure 12 rotates between a retracted position, shown in FIG. 1, and an extended position shown in FIG. 2, which is approximately ninety degrees about the pivot axis 28 from the retracted position. The sign structure 12 is normally in the retracted position shown in FIG. 1 and is reciprocated to the extended position shown in FIG. 2 for use and back to the retracted position shown in FIG. 1 after use.

Preferably, the pivoting sign structure 12 includes a sign plate, indicated generally at 14, preferably a stop sign plate in the shape of an octagon, and a bracket 16 supporting the sign plate. Bracket 16 is pivotally mounted with the housing 20. The sign plate 14 is preferably mounted to the bracket 16 in a conventional manner such as with a plurality of nuts and bolts, indicated generally at 18.

The housing 20 is adapted, at least by the provision of a generally flat surface which faces the vehicle wall 8 and by the provision of laterally extending flanges 22 and 24, for mounting the device 10 to the outer surface of the vehicle side wall 8, again preferably with nuts and bolts, which are indicated generally at 26 in the figures, or other conventional permanent or removable fastening means. The boxlike housing 20 is squared off for ease of construction and includes a generally rectangular main body portion 30 best seen in FIG. 3. Main body portion 30 is formed by a rectangular rear wall 52 and four connected rectangular side walls 54–57 extending perpendicularly from edges of the rear wall 52. Referring back to FIGS. 1 and 2, a cover 32 is removably mounted over an open front side of the main body portion 30 of the housing 20. The cover 32 can be provided with turned edges (not depicted) so as to overlap facing walls of the main body portion 30 of the housing 20 and can be removably secured thereto by suitable means such as machine screws 34 extending into one of the turned edges of the cover 32 and a generally parallel adjoining side wall of the main body portion 30 of the housing 20. Sign plate 14 may be further provided with one or more electrically operated lights 36 and 38. In a preferred use of the device 10, as a stop sign signal on a school bus, such lights are mandated by federal regulations. If desired, one or more cushioning pads 40 can be provided on the cover 32, where any point of the pivoting sign structure 12 strikes or is closest to the major planar surface of the cover 32, to cushion any impact of the sign plate structure 14 against the housing 20.

FIG. 3 also depicts the preferred internal components of the device 10. These include actuator means, indicated generally at 42, which preferably includes an air cylinder, indicated at 44, and a connected linkage, indicated generally at 45. Air cylinder 44 can be controllably operated for rotating the bracket 16 of sign assembly 12 about the pivot axis 28.

Referring to FIG. 4, the preferred air cylinder 44 includes a tubular housing 46, a piston 47 mounted for linear reciprocation through the housing, a piston arm 48 fixedly coupled with piston 47 and extending through an end wall 49 of the housing 46 and a compression coil return spring 50 positioned between the piston 47 and the end wall 49 of the cylinder housing, surrounding the piston arm 48. Piston 47 further mounts at least one and, preferably, a pair of non-moving O-ring type seals 47a, 47b. Coupling 51 permits air to be fed into or removed from the housing 46 to move piston 47 and arm 48. Compression coil spring 50 is positioned to resist movement of the piston 47 when air pressure in the housing is varied from an atmospheric level in an increasing direction by the supply of compressed air or other fluid through coupling 51. The cylinder 44 could function as a vacuum cylinder responsive to fluid pressure decreasing from atmospheric levels by coupling a vacuum line to the cylinder housing 46 on the left side of the piston 47 in the figures.

Referring back to FIG. 3, the device 10 preferably further includes an electrically powered, air pressure adjustment means, indicated generally at 60, which is fluidly coupled through tubes 62, 64 to the air cylinder 44. The air pressure adjustment means 60 couples the air cylinder 44 directly to atmosphere and is electrically driven for altering air pressure within the air cylinder 44 from an atmospheric level to move the piston 47 and connected piston arm 48. The preferred air pressure adjustment means 60 is an electrically driven air compressor given the same reference number 60. Compressor 60 includes an electric motor 66 geared to an eccentric 68 reciprocating a piston assembly 70 in a compressor housing 72 having an inlet (not depicted) open to atmosphere. One end of tubing 62 is coupled to the compressor housing 72 through a mechanical check valve (not depicted), which permits air compressed within the cylinder housing 72 to pass into the tubing 62 and 64. Air cylinder 44 is thus effectively coupled to atmosphere through the compressor 60.

Preferably, adjoining ends of the tubing 62 and 64 are coupled together through an electrically operated valve 80, which is provided for controllably venting compressed air from the fluid coupling between the air compressor 60 and air cylinder 44, which is provided by the tubing 62 and 64. Valve 80 is preferably three-way and installed so as to fluidly couple each tubing 62 and 64 to atmosphere or to fluidly couple tubing 62 and 64 to one another and closed off to atmosphere in response to an electric current signal, which is applied to the valve 80 to control the state of the valve 80. In this way, tubing 62 and 64 can be pressurized by applying an electric current signal to the valve 80, closing off the tubing 62, 64 to atmosphere, and then controllably venting the compressed air from the tubing 62, 64 to atmosphere as soon as the electrical current signal is terminated.

Still referring to FIG. 3, the coupling linkage 45 between the air cylinder 44 and the pivotable bracket 16 is indicated. The bracket 16 is very roughly U-shaped, including upper and lower generally parallel arms 92 and 94, extending from a cross member 96 supporting the sign plate 14 (not depicted). Arms 92 and 94 overlap upper and lower walls 56 and 57, respectively, of the main body portion 30 of housing 20. Preferably, a shaft 98 is non-rotatably coupled with lower arm 94 and is extended through lower housing wall 57 into the main body portion 30, where it is rotatably received by a bracket 100 fixedly coupled to side wall 54 of the main body portion 30. Shaft 98 is coaxial and concentric with the pivot axis 28. The remaining arm 92 is also pivotably coupled to the main body portion 30 by suitable means such as, for example, by the provision of a stub shaft extending from arm 92 through upper wall 56, concentric with the pivot axis 28, or by comparable means such as the provision of an axle non-rotatably coupled to the upper wall 56 and rotatably extending through the arm 92 or an axle extending through both arm 92 and upper wall 56 and rotatable with respect to each. Shaft 98 may be provided, for example, by a common carriage bolt, the head of which is received in a hex-shaped recess provided on the arm 94, which prevents rotation between the bolt and the arm 94. Preferably, a second shaft 102 is supported parallel with and spaced from the shaft 98 and is fixedly coupled thereto by upper and lower arms 104 and 106, respectively, each of which may be pairs of clamping members, so as to provide a U-shaped lever arm 102/104/106 for rotating the shaft 98. The end of the piston arm 48 remote from the rest of air cylinder 44 has a clevis 108 with a transverse bore which is received on the second shaft 102. The opposing end of the air cylinder tubular housing 46 is preferably provided with a mounting flange having a transverse mounting hole therethrough which is received in a second clevis 110 fixedly mounted to the rear wall 52 of the main body portion 30. The end of the air cylinder 44 is pivotally secured in the second clevis 110 by means of yet a third shaft 112 passed through the clevis 110 and received in the bore provided transversely through the mounting flange on the opposing end of the tubular housing 46 of the air cylinder 44. In this way, the air cylinder 44 is itself pivotally supported between the second and third shafts 102 and 112.

Preferably, a single electrical current signal control line 120 is provided to power and control the actuation of the device 10. This single line 120 is preferably electrically coupled to circuitry within the school bus or other vehicle to which the device 10 is mounted, which circuitry is provided for lighting warning lights on the school bus and/or the lights 36, 38 on the sign plate 14 when the bus stops to take on or discharge passengers. The device 10 can be operated by the same button, switch or other control mechanism or element, which is normally provided in vehicles with which the device 10 is used to illuminate or flash such lights of such vehicles. The single control line 120 passes through the rear wall 52 of the housing 20 and is split into two parallel branches. One branch indicated at 120a extends to the compressor electric motor 66. A second parallel branch indicated at 120b extends to the electrically operated check valve 80. A ground line 122 extends from the compressor motor 66 to a spring-loaded electrical disconnect switch 130 while a separate ground line 124 extends from the check valve 80 to vehicle ground, preferably through upper wall 56 of the main body portion 30 which is itself grounded to the vehicle. The switch 130 is normally closed and electrically couples the ground line 122 from the air compressor motor 66 to vehicle ground, for example, through the bracket 100 and main body portion 30 which are preferably made from an electrically conductive material. A lever arm 118 is fixed to the upper arm 104 in position to contact a plunger 132 of the disconnect switch 130. When depressed, plunger 132 breaks the electrical connection between the ground line 122 and the bracket 130, creating a break in the compressor electrical circuit.

Preferably, the device 10 of the present invention is further equipped with its own, conventional, three-terminal, twelve-volt automotive flasher 126 which is mounted by means of yet another bracket 127 to the rear wall 52 of the main body portion 30. Preferably, the single electrical control line 120 from the vehicle is connected to the power terminal of the flasher and line 120a and 120b to the compressor motor 66 and valve 80, respectively, branched in parallel from that connection. The other two terminals of the flasher 126 are coupled with individual lines 120c and 120d which are extended with a protective covering 128 through a grommet provided in the lower wall 57 of boxlike portion 30 to the sign plate 14 where the lines 120c and 120d are extended from the protective cover 128 to the individual lights 36 and 38, respectively (see FIG. 2). This configuration permits true "single wire" operation of the device 10. Alternatively, lines 120c and 120d could be provided from a flasher circuit within the vehicle, controlled by a flasher within the vehicle and connected through the side wall of the vehicle directly to the lights 36 and 38 or, more desirably, through the rear wall 52 and out through the lower wall 57 of the boxlike portion 30 of the housing 20.

Referring to FIG. 5, the compressor 60 is preferably mounted to the main body portion 30 by attachment to a platform indicated generally at 140. Platform 140 is preferably fixedly coupled to the rear wall 52 of the main body portion 30. The platform 140 preferably comprises a pad 142 of rubber or other resiliently elastomeric material supported by a plurality of bolts 144 projecting from the rear wall 52 of the housing 20. Pad 142 provides a sound and vibration dampening coupling between the compressor 60 and the housing 20.

The compressor 60 is preferably any of a variety of twelve-volt, miniature portable air compressors which are manufactured and supplied by a variety of domestic sources for use such as a portable, vehicle air pump. The compressor 66 could be, for example, the working components of a HI-FLO 220 air compressor available from KP Industries of Delphos, Ohio. The electrically powered check valve 80 could be any suitable valve available from any of a variety of domestic sources such as, for example, a Model ETO-3-12 Minimatic® Electronic/Pneumatic Valve from Clippard Instrument Laboratory, Inc., Cincinnati, Ohio. The air cylinder 44 may be obtained from any of a variety of domestic manufacturers and distributors and may be, for example, a Model 18S-1 Minimatic® Air Cylinder, also from Clippard Instrument Laboratory, Inc., which includes an internal return spring and which is fitted with a clevis for mounting to the second shaft 102. Flasher 126 may be, for example, a twelve-volt Model 357 flasher distributed by Wagner Electric of Parsippany, N.J.

Installation of the device 10 on a vehicle is straightforward and simple. The housing 20 is simply bolted to the vehicle in the manner indicated previously through flanges 22, 24 and the single control wire 120 passed through an opening in the rear wall 52 of the main body portion 30 and through the adjoining wall 8 of the vehicle and coupled in the manner previously indicated to an electrical circuit within the vehicle including an electrical switch provided for controlling the illumination and/or flashing of lights of the vehicle, or to a separate switch which is dedicated to simply activating the device 10.

Operation of the device 10 is straightforward. When a twelve-volt current-type signal is applied to the electrical control line 120, motor 66 of the air compressor 60 is activated, the check valve 80 is closed to atmosphere, and pulses of direct current are supplied from flasher 126 to lights 36 and 38. Compressor 60 rapidly pressurizes tubes 62 and 64 causing the piston 46 in the air cylinder 44 to move from a rightmost position in FIGS. 3 and 4, against the bias of the spring 50, to a leftmost position extending the arm 48. Arm 48 displaces shaft 102 rotating the shaft 98, causing the fixedly connected bracket 16 and sign plate 14 to pivot from the retracted position shown in FIG. 1 to the extended position shown in FIG. 2. Upon reaching the extended position shown in FIG. 2, lever arm 118 depresses the plunger of switch 130, breaking the electrical ground connection of the compressor motor 66, which causes the motor 66 to cease operation. Current, however, is still supplied to the lights 36 and 38 and to the check valve 80, closing that valve to atmosphere and maintaining pressure in the tubes 62 and 64. When the control device within the vehicle is switched off, switching off the twelve-volt current-type signal supplied on control line 120, lights 36 and 38 cease flashing and check valve 80 changes state, coupling the tubing 62 and 64 to atmosphere, thereby venting the compressed air from between the compressor 60 and air cylinder 44. Return spring 50 forces the air cylinder piston 47 back to its initial position, thereby retracting piston arm 48 into the cylinder 44, rotating shaft 98 in an opposite direction, returning the bracket 16 and remainder of the sign assembly 12 to the retracted position shown in FIG. 1.

The disclosed preferred device shares many of the unique advantages of prior electrical or prior fluidly-operated devices. The preferred device requires only one twelve-volt connection to the vehicle for operation and control, and responds automatically to the constant twelve-volt signal to extend the sign and flash its lights and to the discontinuance of that signal to retract the sign and cease flashing of its lights. Air compressors of the type identified are extremely efficient, developing enough pressure in only about one or two seconds of operation to cause full deployment of the sign assembly 12. Prior electrically driven devices mechanically coupled an electric motor to the sign assembly through a reduction gear train and had to be operated a longer time (on the order of about five seconds) first to deploy the sign and then again to retract the sign. The present device greatly reduces the duty cycle and thus wear on the driving electric motor.

The presently preferred design enjoys the beneficial aspects of a fluidly operated system but dispenses with the necessity of fluid couplings between the device 10 in a vehicle to which it is mounted. Each of the major fluid components of the device 10, the air cylinder 44, compressor 60 and check valve 80, is commercially available from a variety of sources and is relatively easily installed. Air cylinder 44, in particular, is a significant improvement over prior bellows or diaphragm equipped devices in terms of reliability, since the pneumatic seal is provided by long-wearing O-rings 47a, 47b mounted to the piston 47. Thus, this design eliminates those components of the prior fluid devices which were most susceptible to wear. In addition, the preferred, spring-equipped air cylinder 44 can be mounted to maintain a spring tension on the second shaft 102 while the side assembly 12 is in the stowed position, depicted in FIG. 1, to dampen any vibration of the sign assembly 12 induced by wind flowing over the assembly 12 when the vehicle on which the device 10 is mounted is moving. The air cylinder 44 permits the sign assembly 12 to swing away from the housing body to the deployed position indicated in FIG. 2 simply by overcoming the resistance of the return spring 50 if a sufficiently large force is applied against the sign assembly. If a sufficiently large force is applied to the sign assembly while the sign assembly 12 is deployed or being deployed, forcing the sign assembly 12 back towards the housing 20, the check valve 80 will be overcome and will vent the tubing 62 and 64 to atmosphere.

While a preferred embodiment of the invention has been disclosed, a number of variations could be made while retaining the beneficial aspects of the invention. Initially, instead of a pneumatic system, the system could be configured as a vacuum system by substituting a vacuum pump for the compressor 60. The previously described changes would have to be made to the air cylinder 44 and a vacuum-type check valve substituted for the previously identified pressurized check valve 80. Also, although a linearly reciprocating air cylinder actuator 44 and linkage 45 have been disclosed rotating sign assembly 12 through an offset shaft 102, it is conceivable that rotatable fluid-operated actuators are available or could be available which could be directly coupled with bracket shaft 98 for direct rotation thereof. If desired, more complicated control systems could be provided including one or more sensors which might detect obstruction of the sign assembly 12 during movement to cut electrical power to the compressor 60 and/or open check valve 80. Moreover, the fluid coupling provided by tubing 62, 64 is a convenience for coupling together off-the-shelf components. The compressor 60 could conceivably be coupled directly with the air cylinder 44 and the air cylinder or the compressor valved to eliminate tubes 62, 64.

While the preferred device 10 is entirely self-contained for autonomous operation, if desired, the device 10 could be modified to couple the air cylinder 44 with a source of compressed air from the vehicle or another cylinder modified for vacuum actuation provided for coupling with a vacuum source from within the vehicle. Also, the compressed air or vacuum source from the vehicle could further be controlled within the vehicle in a manner permitting the elimination of valve 80 from device 10. Of course, in either case, a pneumatic or vacuum line would have to be provided from the vehicle. However, as was pointed out above, the preferred spring return type cylinder employed in the preferred embodiment of the present invention provides several distinct advantages over the diaphragm and/or bellows-type systems which were previously employed for fluid operation and constitutes an improvement over those systems.

From the foregoing description, it can be seen that the present invention provides a self-contained, easily installed, pivoting sign device for mounting on a vehicle. While various changes thereto have been suggested, it will be recognized by those skilled in the art that other changes could be made to the above-described preferred embodiment of the invention without departing from the broad inventive concepts thereof. It should be understood, therefore, that this invention is not limited to the particular embodiment disclosed, but is intended to cover any modifications which are within the scope and spirit of the invention, as defined by the appended claims.

I claim:

1. A pivoting sign device for mounting on motor vehicle comprising:
   a housing adapted for mounting on a motor vehicle;
   sign means pivotally coupled with the housing for rotation about an axis;
   actuator means at least partially located within the housing, the actuator means comprising an air cylinder including a piston arm extending from a piston within the air cylinder and coupled to the sign means for rotating the sign means about the pivot axis, the piston arm being movable in response to an air pressure within the air cylinder varied from atmosphere air pressure; and
   air pressure adjustment means comprising an electrically powered air compressor within the housing, a fluid coupling between the air cylinder and the air compressor and an electrically operated value means, the air pressure adjustment means being electrically operated, the valve means and the air compressor being wired together so that the application of a single electrical signal causes the air compressor to operate and the value means to actuate for altering air pressure within the air cylinder from an atmospheric level to move the piston arm and rotate the sign means.

2. The device of claim 1 wherein the valve means comprises an electrically operated valve normally venting the fluid coupling to atmosphere and, in response to the applied electric signal, sealing the fluid coupling from atmosphere.

3. The device of claim 2 wherein the actuator means further comprises a spring mounted within said air cylinder to resist movement of the piston and piston arm when air pressure within the air cylinder is varied in a predetermined direction from said atmospheric level.

4. The device of claim 1 wherein the sign means includes an electric light powered by the same, single electrical signal.

5. The device of claim 1 wherein the same, single electrical signal is a continuous electrical signal applied to the device to cause the sign means to pivot from an initial position adjacent the housing to a deployed position approximately perpendicular to the housing as long as the continuous electric signal is applied to the device and further comprising flasher means within the device responsive to the same, single continuous electrical signal for flashing the light on and off.

6. The device of claim 1 further comprising biasing means coupled with one of the sign means, the actuator means and the piston arm for resisting movement of the sign means and the piston arm.

7. A pivoting sign device for mounting on a motor vehicle comprising:
   a housing adapted for mounting on a motor vehicle;
   sign means pivotally mounted to the housing for rotating about an axis;
   a fluid cylinder within the housing, the fluid cylinder including a generally tubular closed housing, a piston mounted for reciprocation through the tubular housing, an arm coupled with the piston for reciprocation with the piston, an end of the arm extending through an end of the tubular housing, a fluid coupling into the tubular housing on one side of the piston for moving the piston in a first direction relative to an initial position within the tubular housing and biasing means effectively coupled with the tubular housing and at least one of the piston and the arm for returning the piston to the initial position after movement in the first direction;
   means coupling the end of the arm with the sign means for pivoting the sign means about the axis with the fluid cylinder;
   valve means coupled with the fluid coupling for controllably venting of the tubular housing; and
   an electrically operated air pressure adjustment means coupled with the fluid cylinder for altering pressure within the tubular housing of the fluid cylinder from an atmospheric level to move the piston in the first direction, the air pressure adjusting means including an electrically powered fluid compressor within the housing.

* * * * *